(12) United States Patent
Chikovani et al.

(10) Patent No.: US 7,281,425 B2
(45) Date of Patent: Oct. 16, 2007

(54) CORIOLIS FORCE GYROSCOPE WITH HIGH SENSITIVITY

(75) Inventors: Valery V. Chikovani, Kiev (UA); Yuri A. Yatzenko, Kiev (UA); Vladimir A. Kovalenko, Kiev (UA)

(73) Assignee: Innalabs Technologies, Inc., Dulles, VA (US)

( * ) Notice: Subject to any disclaimer, the term of this patent is extended or adjusted under 35 U.S.C. 154(b) by 177 days.

(21) Appl. No.: 11/284,922

(22) Filed: Nov. 23, 2005

(65) Prior Publication Data
US 2006/0266116 A1 Nov. 30, 2006

(30) Foreign Application Priority Data
May 31, 2005 (UA) .............................. 200505177

(51) Int. Cl.
*G01P 9/04* (2006.01)
(52) U.S. Cl. .................................. 73/504.13
(58) Field of Classification Search ............. 73/504.12, 73/504.13
See application file for complete search history.

(56) References Cited

U.S. PATENT DOCUMENTS 4,644,793 A 2/1987 Church 6,016,699 A 1/2000 Kasanami et al.
6,640,630 B1 * 11/2003 de Salaberry ............ 73/504.13

OTHER PUBLICATIONS

Yatsenko, Y., et al., "The principle of angular rate sensors building on the basis of solid-state wave gyro using cylindrical resonator and poaition excitation." Central Design Bureau "Arsenal" (1996).
Chikovani, V.V., et al., "Test Results for the First Batch of Coriolis Vibratory Gyroscopes and Analysis of Their Characteristics," Gyroscopy and Navigation 2:41 (2003).

* cited by examiner

*Primary Examiner*—John E. Chapman
(74) *Attorney, Agent, or Firm*—Bardmesser Law Group

(57) ABSTRACT

A gyroscope includes a substantially cylindrical resonator mounted in a housing, and a bottom plate attached to the resonator. A plurality of openings are arranged circumferentially and equiangularly on the bottom plate. A plurality of piezoelectric elements arranged between the openings on the bottom plate. The number of openings can be anywhere between 2 and 16, with eight openings preferred, with a corresponding number of piezoelectric elements. Preferably, substantially the entire available area of the bottom plate is taken up by the piezoelectric elements. The piezoelectric elements can be inside or outside the resonator.

13 Claims, 8 Drawing Sheets

CORIOLIS FORCE GYROSCOPE WITH HIGH SENSITIVITY

CROSS REFERENCE TO RELATED APPLICATIONS

This application claims priority to Ukrainian Patent Application No. 200505177, filed May 31, 2005, which is incorporated herein by reference in its entirety.

BACKGROUND OF THE INVENTION

1. Field of the Invention

The present invention is related to gyroscopes, and more particularly, to gyroscopes having high sensitivity and high signal-to-noise ratio.

2. Background Art

Vibrational gyroscopes have many advantages over conventional gyroscopes of the spinning wheel type. Thus, a vibrational gyroscope is considerably more rugged than a conventional spinning wheel gyroscope, can be started up much more quickly, consumes much less power and has no bearings which could be susceptible to wear.

A wide variety of vibrating members have been employed in previously proposed vibrational gyroscopes, ranging in shape from a tuning fork to a pair of torsionally oscillating coaxial spoked wheels. However the present invention is particularly concerned with vibrational gyroscopes in which the vibrating member comprises a radially vibrating annular shell, such as a hemispherical bell or a cylinder for example. In such gyroscopes the axis of the annular shell (e.g., the z axis) is the sensitive axis and the shell, when vibrating, periodically distorts in an elliptical fashion with four nodes spaced regularly around the circumference and located on the X and Y axes. Any rotation about the z axis generates tangential periodic Coriolis forces which tend to shift the vibrational nodes around the circumference of the shell and thereby generate some radial vibration at the original nodal positions on the X' and Y' axes. The Coriolis force can be calculated based on the relationship $F_c = 2V \times \Omega$, where $F_c$ is the Coriolis force, V is the linear velocity vector of the mass elements of the resonator (shell) due to fundamental mode vibration, "x" is the vector product, and $\Omega$ is the angular velocity vector. Consequently the output of one or more transducers located at one or more of these nodal positions gives a measure of the rotation rate (relative to an inertial frame) about the Z-axis.

This highly symmetrical system has a number of important advantages over arrangements in which the vibrating member is not rotationally symmetrical about the z-axis. Thus, the component of vibration rotationally induced by the Coriolis forces is precisely similar to the driving vibration. Consequently, if the frequency of the driving vibration changes (e.g. due to temperature variations) the frequency of the rotationally induced component of vibration will change by an identical amount. Thus, if the amplitude of the driving vibration is maintained constant, the amplitude of the rotationally induced component will not vary with temperature. Also the elliptical nature of the vibrational distortion ensures that the instantaneous polar moment of inertia about the z-axis is substantially constant throughout each cycle of the vibration. Consequently, any oscillating torque about the z-axis (due to externally applied rotational vibration) will not couple with the vibration of the walls of the shell. Accordingly vibration gyroscopes incorporating an annular shell as the vibrating member offer superior immunity to temperature changes and external vibration.

However in practice, vibrational gyroscopes generally employ piezoelectric transducers both for driving and sensing the vibration of the vibrating member. In cases where a vibrating annular shell is employed, the transducers are mounted on the curved surface of the shell, generally near its rim. Since it is difficult to form a low compliance bond between two curved surfaces, the transducers must be sufficiently small to form an essentially flat interface with the curved surface of the annular shell. The output of the vibration-sensing transducers is limited by their strain capability, so that the sensitivity of the system is limited by signal-to-noise ratio. All these problems become more acute as the dimensions of the annular shell are reduced.

FIG. 1 illustrates how Coriolis forces are used in gyroscopes to measure the speed of rotation. As shown in FIG. 1, a resonator, typically in the shape of a cylinder, designated by 104 in its un-deformed state, is rotated. The vibration modes of the cylinder 104 involve "squeezing" the cylinder along with one of its two axes, thereby forming an ellipse. One of the axes, designated by X, becomes the major axis of the ellipse, and the other one, designated by Y, becomes the minor axis of the ellipse. This is the primary vibration mode of the cylindrical resonator, with the vibration mode designated by 101 in FIG. 1.

In essence, the cylindrical resonator alternates between orthogonal states, shown by 101 in FIG. 1. When the resonator rotates at an angular velocity $\Omega$, a second vibration mode starts to appear, which is designated by 102 in FIG. 1. This is due to Coriolis force vectors 103, which result in a Coriolis force in a combined Coriolis vector 105. Therefore, the added standing vibration wave 102 is oriented at 45° relative to the primary vibration modes 101. The amplitude of the standing wave 102 is related to the angular velocity of the resonator, and is processed electronically to generate a value representative of that angular velocity. It will be appreciated from FIG. 1 that if the rotation of the resonator 104 were counterclockwise (instead of clockwise, as shown in the figure), the orientation of the resulting Coriolis force vector would be at 90° to what is indicated by 105 in FIG. 1, and would be detected accordingly.

As discussed above, conventional Coriolis force gyroscopes typically use a machined resonator cavity, or cylindrical resonator, with a number of piezoelectric elements that are attached to the body of the cylinder. Some of the piezoelectric elements are used to drive the vibration of the cylinders, and others are used to detect the standing wave due to the rotation, indicated by 102 in FIG. 1. A typical arrangement involves eight such piezoelectric elements arranged, equiangularly around the circumference of the resonator 104, such that the major and minor axes of the ellipse (X and Y in FIG. 1) have four piezoelectric elements used to generate the primary vibration mode 101, and four piezoelectric elements arranged along the axes X' and Y', used to detect the standing wave 102 due to the Coriolis force.

It is relatively straightforward, using current technology, to machine a very precise resonator 104, to extremely high tolerance. However, the piezoelectric elements are typically glued to the outside of the resonator. The overall structure, therefore, deviates from a perfectly symmetrical structure, since it is extremely difficult to glue the piezoelectric elements with perfect repeatability. Typical dimensions of such structures are on the order of a few millimeters to perhaps a centimeter for the smaller resonators, and larger dimensions for some of the bigger ones. The fact that the perfectly vibrating cylinder of FIG. 1 becomes an asymmetrical structure has a direct effect on the gyroscope sensitivity, and the signal-to-noise ratio, since some of the Coriolis force-driven standing wave 102 and the primary vibration mode 101 begin to overlap, rather than be at a perfect 45° angle to each other.

Accordingly, there is a need in the art for a gyroscope with high precision, high sensitivity and a high signal-to-noise ratio.

BRIEF SUMMARY OF THE INVENTION

The present invention relates to Coriolis force gyroscopes with high sensitivity that substantially obviates one or more of the disadvantages of the related art.

More particularly, in an exemplary embodiment of the present invention, a gyroscope includes a substantially cylindrical resonator mounted in a housing, and a bottom plate attached to the resonator. A plurality of openings are arranged circumferentially and equiangularly on the bottom plate. A plurality of piezoelectric elements arranged between the openings on the bottom plate. The number of openings can be anywhere between 2 and 16, with eight openings preferred, with a corresponding number of piezoelectric elements. Preferably, substantially the entire available area of the bottom plate is taken up by the piezoelectric elements. The piezoelectric elements can be inside or outside the resonator.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS/FIGURES

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Reference will now be made in detail to embodiments of the present invention, examples of which are illustrated in the accompanying drawings.

Figure 2:
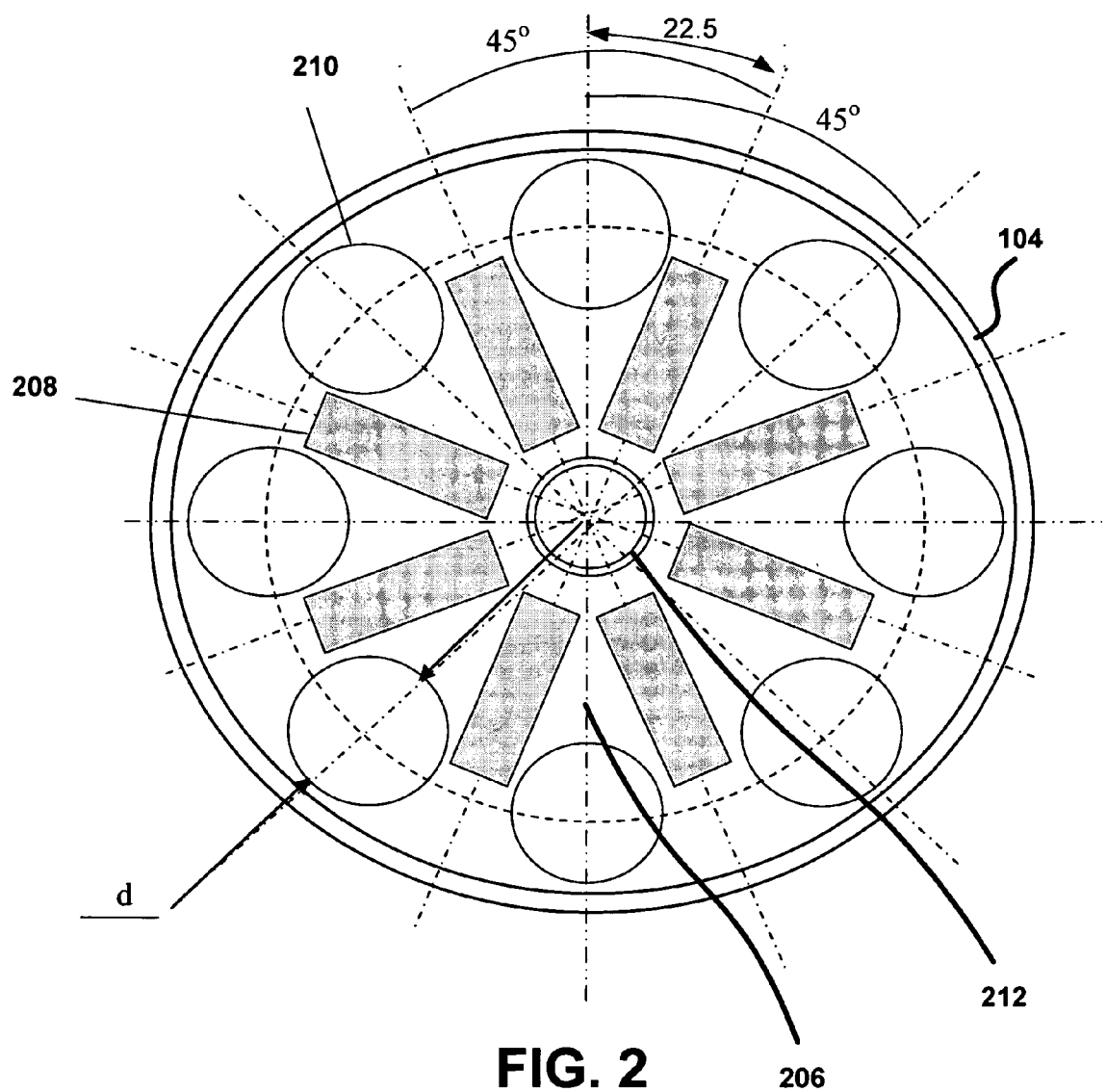
FIG. 2 illustrates a gyroscope according to one embodiment of the invention.

FIG. 2 illustrates one embodiment of the invention. As shown in FIG. 2, a resonator of a Coriolis force gyroscope, shown in a top plan view, includes a resonator body 104 and a bottom plate 206, which has been modified in a particular way. The bottom plate 206 includes a plurality of openings 210, which are preferably equi-angularly distributed around the periphery of the bottom plate 206. The bottom plate 206, therefore, in effect, has a number of "spokes" (as in wheel spokes). In between the openings 210, a number of piezoelectric elements 208 are placed on the bottom plate. 212 in FIG. 2 designates a mounting hole, which is used to secure the resonator 104.

The piezoelectric elements 208 act to both vibrate the resonator 104 in its primary mode, and to detect the secondary vibration mode of the resonator 104. It should be noted that without the openings 210, the piezoelectric elements 208 will detect mostly the vibration modes of the bottom plate 206 itself, which are generally similar to the vibration modes of a membrane, such as a surface of a drum. However, the addition of the openings 210 enables the piezoelectric elements 208 to detect the secondary vibration mode of the resonator.

Furthermore, it should be noted that the number of openings in piezoelectric elements 208 need not be eight, as shown in FIG. 2. In the degenerate case, only two openings and two piezoelectric elements 208 (positioned at 90° to the openings) can be used. Other combinations are possible, such as the use of three openings arranged at 120°, and correspondingly three piezoelectric elements 208 also located at 120°, and offset from the openings by 60°. It will be understood that the processing of the signals involved is somewhat more complex where the secondary vibration mode is not perfectly aligned with some of the piezoelectric elements 208 (as would be the case when eight openings and eight piezoelectric elements 208 are used), however, with modern computational technology, this is not a difficult computational problem to solve.

Other variations are possible, e.g., the use of 4, 5, 6, or 7 openings and corresponding piezoelectric elements 208. As yet another possibility more than 8 such openings can be used, e.g., 16. However, manufacturability is an issue, since as the number of such openings and piezoelectric elements 208 increases, the signal-to-noise ratio and sensitivity increases, but the manufacturing costs also increase as well.

The piezoelectric elements 208 can be located both inside the cylindrical resonator (in other words on the side of the bottom plate 206 that faces into the resonator 104), or on the side of the bottom plate 206 that faces outside.

Figure 4:
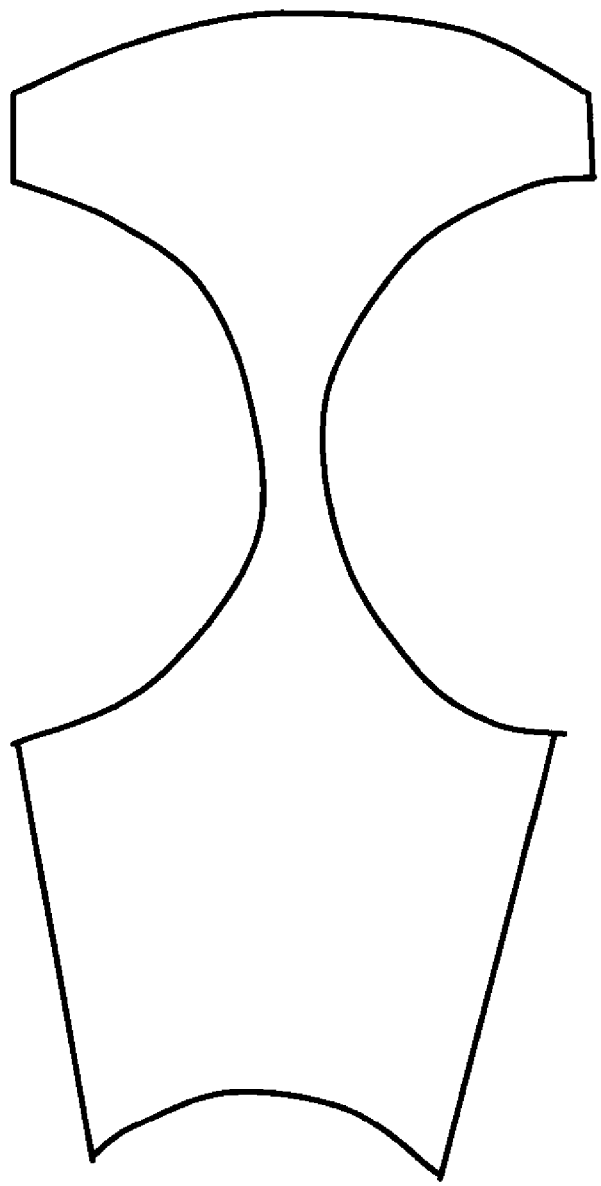
FIG. 4 illustrates one embodiment of a piezoelectrode that can be used in the present invention.

Generally, it is preferred to utilize as much of the area of the bottom plate 206 as possible. In other words, whatever space is available after the openings 210 are made, should preferably be used for locating the piezoelectric elements 208. Thus, rectangular piezoelectric elements 208, such as shown in FIG. 2, do no necessarily use up all the available area. A piezoelectric element 208, such as shown in FIG. 4, takes advantage of more of the available area. Furthermore, the openings 210 need not be circular, but can have other shape, e.g., oval, etc. It should be noted that while such a shape is more efficient in terms of "real estate" utilization, it is also more difficult to manufacture. Therefore, the advantages provided by such a shape (in terms of device sensitivity, signal-to-noise ratio, dynamic range, etc.) should be balanced against manufacturability issues.

It should also be noted that the present invention is not limited to any particular method of mounting the piezoelectric elements 208 on the bottom plate 206. For example, gluing, epoxying, or any other method known in the art can be used. Furthermore, the air from the cylindrical resonator 104 can optionally be evacuated to achieve a vacuum. For relatively small resonators, on the order of the approximately a centimeter in height, this results in only a minor improvement in performance, on the order of a few percent. For larger resonators, vacuum inside the resonator 104 may be significantly advantageous.

Figure 3:
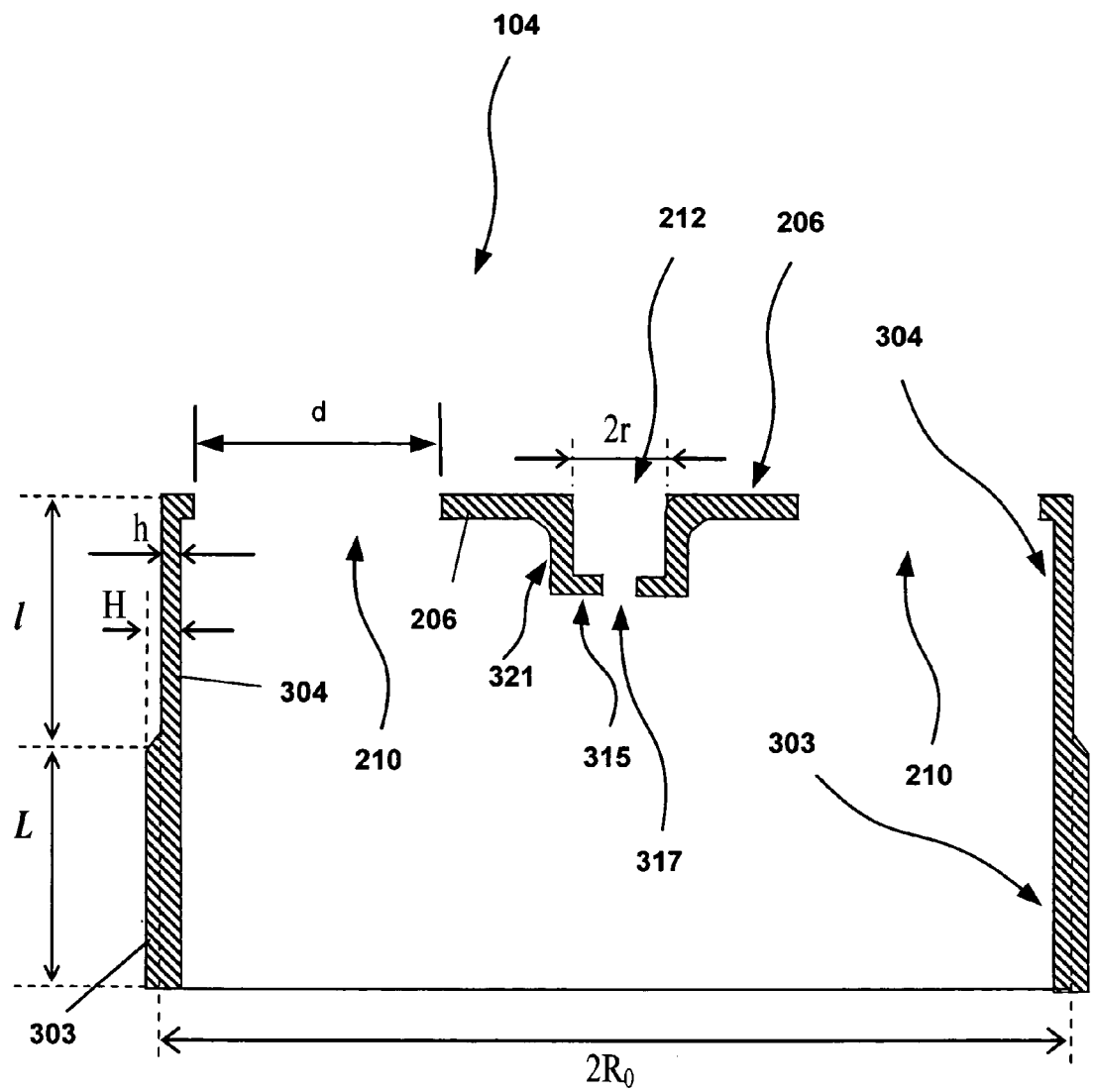
FIG. 3 illustrates a cross-sectional view of the resonator according to one embodiment of the invention.

FIG. 3 illustrates a cross-sectional side view of one exemplary embodiment of the resonator of the present invention. The cylindrical body of resonator 104, as seen in cross-section, has a diameter $2R_0$, and two portions—a relatively stiff portion, designated by 303, and having a length L and a thickness H, and a relatively flexible portion, designated by 304, having a length l, and a thickness h. A fitting 321 with an opening 317 for mounting is used to mount the resonator 104 on a shaft (not shown). Note that it is important that the resonator be tightly mounted, without any "play." The values of the parameters $R_0$, H, L, h, l, r and d can vary greatly, depending on the diameter of the resonator and the field of use of the gyroscope. One exemplary embodiment can have the following values: $R_0$=12.5 mm, H=1 mm, L=8 mm, h=0.3 mm, l=10 mm, r=4 mm, d=5.5 mm.

Figure 1:
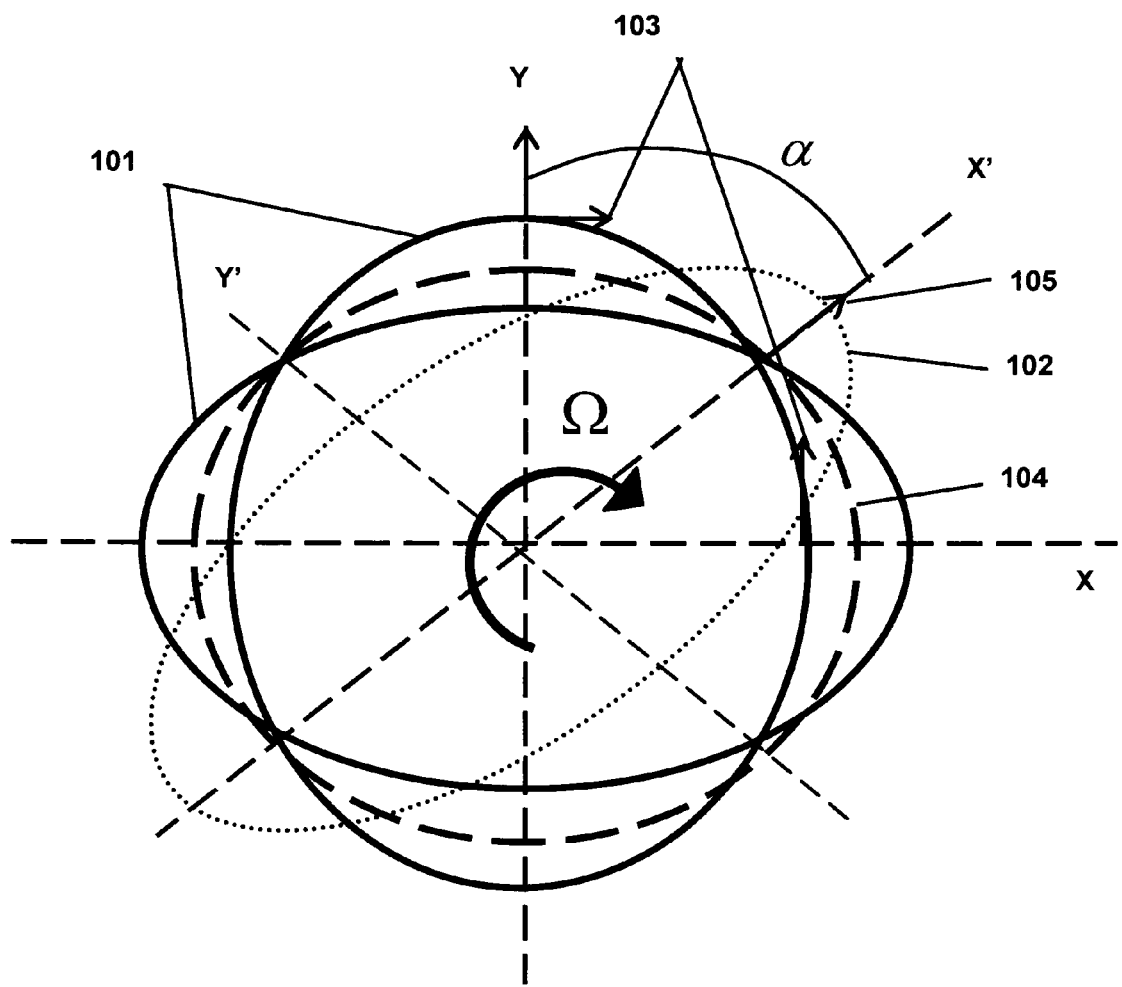
FIG. 1 illustrates how Coriolis forces are used in gyroscopes to measure the speed of rotation.

The gyroscope described herein works as follows. A signal generator supplies an AC signal to opposite piezoelectric electrodes 208, which are glued on the spokes. The frequency of the supplied AC signal is close to the natural vibration frequency of the resonator 104. Due to the bending deformation of the spokes, the resonator 104 vibrates at the fundamental frequency in the 2-nd mode, oriented along the driven piezoelectric electrodes (see 101 in FIG. 1). The piezoelectric elements 208, located at 45 degrees, are therefore used to detect the signal. The signal is proportional to the angular velocity Ω, and can be demodulated, and then used to generate a signal that compensates for the displacement of the orientation of the 2× standing wave 102, as described below with reference to FIG. 6. As one option, the compensation signal can be used as the output signal that represents the angular velocity.

Figure 5A:
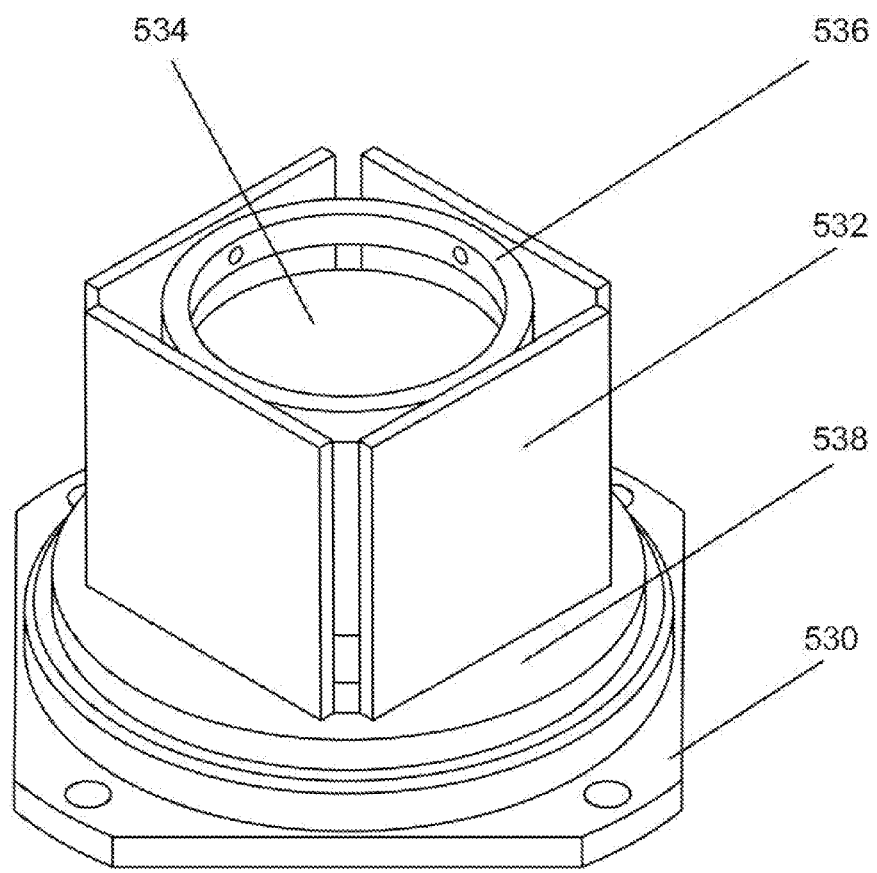
FIGS. 5A-5B illustrates photographs of one embodiment of a gyroscope of the invention.
Figure 5B:
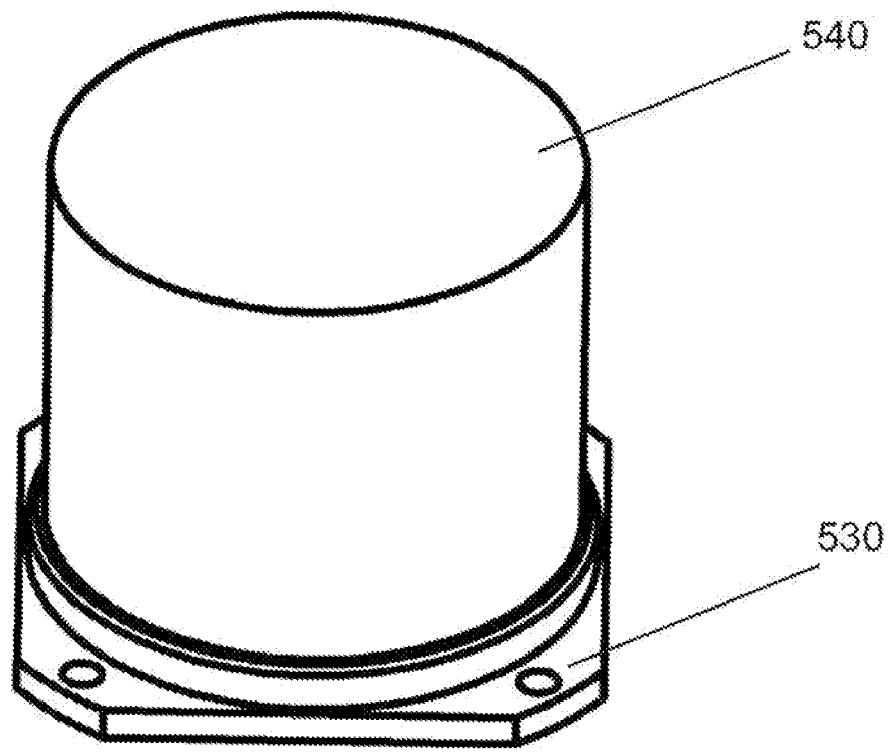

FIG. 5A is a photograph of a gyroscope according to one embodiment of the invention, with its cover removed. The resonator itself is covered by a lid 534 (and is therefore not visible in this figure), and is mounted on a base plate 538 which has a flange 530. Circuit boards 532 are mounted as shown and attached to a ring 536 with screws. The ring 536 is used to maintain stiffness of the overall structure. FIG. 5B shows a gyroscope with a cover 540. The dimensions of the device of FIG. 5B are about 50 mm diameter and 45-50 mm in height, although the device can easily be miniaturized further, for example, through the use of ASICs, etc. Roughly half the volume in the device of FIGS. 5A-5B is taken up by the electronics, the circuit boards 532, etc., which easily lends itself to miniaturization.

The resonator 104 can be manufactured from any number of materials, however, to ensure high stability of the measurements, it is typically manufactured from a material with low internal losses and a high Q factor. Generally, the smaller the resonator 104, the greater the error in the measurements. To reduce the error, the resonator 104 can be made out of materials with high Q factors. Also, temperature stability is also important for some applications, and various precision non-magnetic alloys with known elasticity properties can be used, or titanium alloys with damping coefficients of, e.g., δ=0.03% в δ=0.022%, and a temperature coefficient of Young's modulus of e=5×10⁻⁵1/° C. to e=9×10⁻⁵1/° C. Other materials can also be used, such as various alloys, fused silica, quartz, etc.

Since the thickness of the flexible suspension portion 304 is <<H, its own natural vibration frequency is shifted to lower frequencies. This is seen from the equation for the frequency of vibration of the resonator, which is given by:

$$\omega_i = K(i) \frac{h}{R_0^2} \sqrt{\frac{E}{(1+v)\rho}} \quad (1)$$

where $$K(i) = \frac{i(i^2-1)}{\sqrt{(i^2+1)}}$$

is the coefficient that depends on the mode of the vibration i, E is Young's modulus, ν is Poisson coefficient, ρ is the density of the material of the resonator.

This means that the resonator 104 and the base on which it is mounted are widely separated in frequency space. Therefore, the flexible suspension portion 304 of the resonator 104 functions as a damper when inertial forces act on the resonator 104 (e.g., vibrational forces, shock, impacts, etc.). Furthermore, the natural frequency of the suspension is chosen such that it is significantly different from the maximum frequency of noise, which is typically around 2-3 KHz.

Reducing the thickness h of the suspension portion 304 reduces its rotational moment of inertia, which in turn reduces the demands on the precision of its manufacturing, and reduces the need for perfect symmetry of the manufactured item. This can be seen from the relationship of the moments of inertia $M_k$ of the resonator and moment of inertia of the suspension $M_S$ as they relate to the amplitude of the vibration of the resonator:

$$\frac{M_S}{M_K} = \left(\frac{h}{H}\right)^2$$

Therefore, when $$\frac{h}{H} \leq \frac{1}{4}$$

the tolerance requirements for manufacturing of the suspension portion 304 are reduced by an order of magnitude. Only the resonator portion 303 itself needs to be precisely manufactured, not the rest of the structure, which reduces manufacturing cost substantially.

The bottom plate 206, as well as the flexible suspension portion 304, acts as elastic suspension. Since the electrodes 208 are placed on the bottom plate 206, which increase stiffness along the axes of their orientation, it is necessary to increase the stiffness of the structure between the axes X and Y to enable the resonator 104 to vibrate along the axes X' and Y' in FIG. 1. The eight openings therefore serve this function. The stiffness of the "spokes" (along axes X' and Y') is given by $$C_x = \frac{Eh^3}{12R_0^2},$$

whereas the stiffness of the bottom plate 206 along the axes at at 22.5° relative to the Y axis, is given by $$C_y = \frac{Eh^3}{12(R_0 - d)^2}$$

where d is the diameter of the openings (for circular openings). For the resonator to vibrate along the axis X ???, the following condition must be satisfied:

$$C_x/C_y < 1 \tag{3}$$

Since the electrodes 208 are placed along the axes X, and their stiffness is given by $$C_n = \frac{E_n b h_{n3}}{12 a^3}$$

where b is the width of the electrodes, a is the length of the electrodes, $h_n$—thickness of the electrodes, $E_n$ is Young's modulus of the electrode (e.g., piezo-ceramic Young's modulus). The spokes have the stiffness given by $h_n = h$ if a is approximately equal to $$a \approx \frac{R_0}{2}$$

and $$C_\Sigma = \frac{Eh^3}{12R_0^2}\left(1 + \frac{8E_n b}{ER_0}\right).$$

To satisfy this condition, $C_\Sigma/C_y < 1$ has to hold true, or $$\left(1 - \frac{d}{R_o}\right)^2 \left(1 + \frac{8E_n b}{ER_0}\right) < 1 \tag{4}$$

It is clear that this condition is satisfied even when $d \geq R_0/2$. This, in turn, demonstrates that a gyroscope with such an arrangement of electrodes will have higher sensitivity than a conventional Coriolis force gyroscope.

Figure 6:
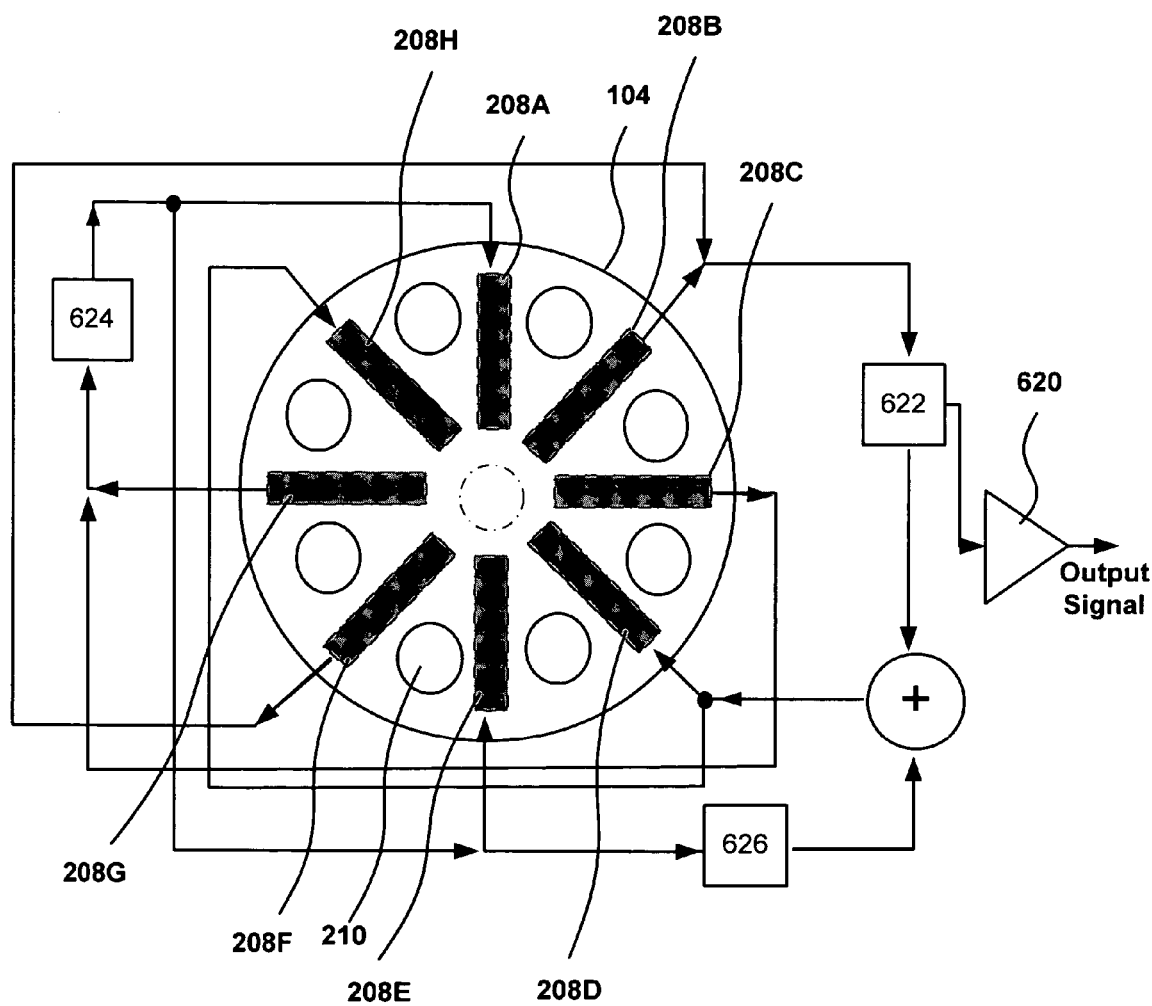
FIG. 6 illustrates an electrical schematic of how the gyroscope is controlled and angular velocity is sensed.

FIG. 6 illustrates the electronic circuit that can be used to control the gyroscope and measure the angular velocity. Piezoelectric electrodes 208A and 208E receive a driving signal in the form of a sinusoidal voltage $A\sin(\omega_0 t)$, where $\omega_0$—is the frequency equal to (or close to) the second order vibrational mode frequency of the resonator 104, typically with an amplitude between 1 and 10 Volts, depending on the dynamic range of the gyroscope. A standing wave is generated, with four nodal points oriented along the piezoelectrodes 208A, 208E and 208G, 208C, and the four nodal points, located along the piezoelectrodes 208B, 208F и208H, 208D. In order to automatically maintain a stable amplitude of oscillation when the gyroscope is functioning, signals proportional to the amplitude of the oscillation are received from the piezoelectrodes 208G and 208C, are summed, and sent to the signal generator block 624, which provides positive feedback control, as well as automatic gain control (AGC). The output of the signal generator block 624 is fed to the piezoelectrodes 208A and 208E. Thus, the signal generator 624 provides for generating the vibration of the resonator 104 with autostabilization of the amplitude of the vibration using the AGC.

Figure 7:
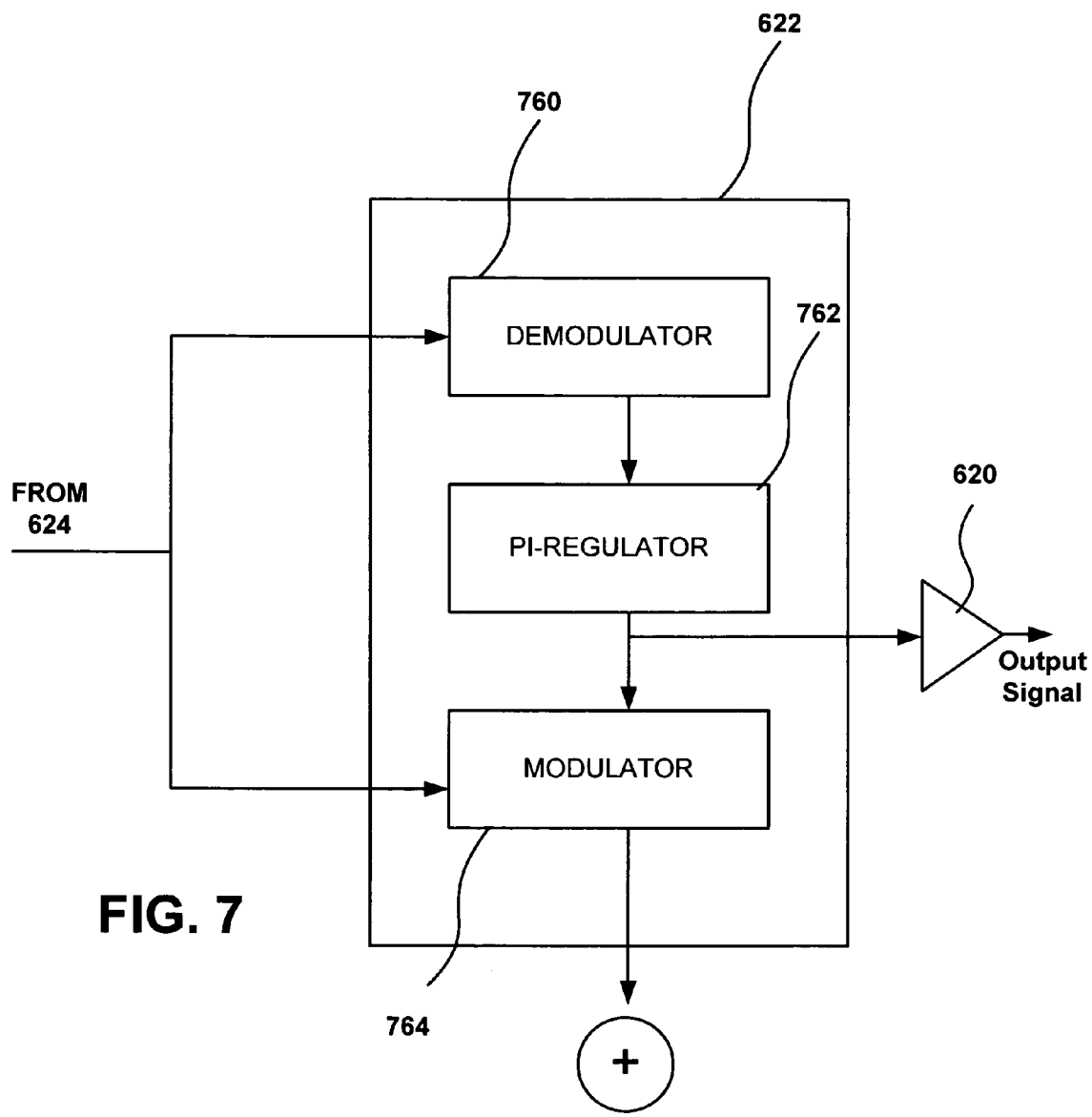
FIG. 7 illustrates an electrical schematic of one of the elements of the control electronics.

In the absence of rotation, when $\Omega=0$, the signal at the nodes of the standing wave (the signal measured by the piezoelectrodes 208B, 208F and 208H, 208D) are minimal (essentially representing the drift of the zero of the gyroscope). When the resonator 104 rotates about its axis of symmetry, the piezoelectrodes 208B, 208F and 208H, 208D measure a signal, which is shifted in phase by 90 degrees relative to the driving signal $A\sin((\Omega_0 t,)$, in other words, a cosine wave $A_1 \cos(\Omega_0 t)$ is measured, whose amplitude $A_1$ is proportional to the angular velocity $\Omega$. This signal is received from the sense piezoelectrodes 208B, 208F is summed, demodulated (see 760 in FIG. 7) using proportional and integral (PI) regulator (see 762 in FIG. 7), then is modulated (see 764 in FIG. 7) by a signal with the same frequency as the driving frequency to form a compensation signal (the signal received by the piezoelectrodes 208A and 208E). These operations are performed in block 622. The inverted signal is then supplied to the control piezoelectrodes 208H and 208D to compensate for a signal that is generated at the nodes. Thus, a negative feedback loop is implemented, which compensates for the signal at the nodes. In this case, the feedback signal from the output of the PI regulator is proportional to the angular velocity vector $\Omega$.

To reduce the zero bias drift of the gyroscope, block 626 can be used, which provides a minimum possible signal in the nodes of the standing wave when the gyroscope is calibrated. This signal is supplied to the control piezoelectrodes 208H and 208D with an opposite phase to the signal present in those electrodes, and which is present primarily due to imperfections of the manufacturing of the resonator 104. This approach permits compensating for mass imbalances caused by differences in resonator cylinder wall thickness.

Block 620 is a programmable gain amplifier that filters the output signal, and normalizes the amplitude of the output signal of the gyroscope.

Having thus described embodiments of the invention, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A gyroscope comprising:
    a substantially cylindrical resonator mounted in a housing;
    a bottom plate attached to the resonator;
    a plurality of openings arranged substantially circumferentially and substantially equiangularly on the bottom plate; and a plurality of piezoelectric elements arranged between the openings on the bottom plate.

2. The gyroscope of claim 1, wherein the plurality of openings comprises eight openings.

3. The gyroscope of claim 1, wherein the plurality of openings comprises at least three openings, and the plurality of piezoelectric elements comprises at least three piezoelectric elements.

4. The gyroscope of claim 1, wherein substantially the entire available area of the bottom plate is taken up by the piezoelectric elements.

5. The gyroscope of claim 1, wherein the piezoelectric elements are inside the resonator.

6. The gyroscope of claim 1, wherein the piezoelectric elements are outside the resonator.

7. The gyroscope of claim 1, wherein the inertial body is non-magnetic.

8. The gyroscope of claim 1, wherein the inertial body is weakly magnetic.

9. The gyroscope of claim 1, wherein the inertial body has a ferromagnetic coating on portions of its surface.

10. A method for manufacturing a gyroscope comprising:
forming a substantially cylindrical resonator;
forming a bottom plate of the cylindrical resonator;
forming a plurality of openings in the bottom plate, the openings arranged symmetrically about an axis of the cylindrical resonator; and
mounting a plurality of electrodes on the bottom plate substantially between the openings.

11. The method of claim 10, wherein the mounting step comprises epoxying the electrodes between the openings.

12. The method of claim 10, wherein the electrodes are piezoelectrodes.

13. A gyroscope comprising:
a substantially cylindrical resonator having a bottom plate;
a plurality of openings arranged substantially symmetrically on the bottom plate; and
a plurality of piezoelectric elements between the openings on the bottom plate.

* * * * *